Jan. 17, 1961  J. J. McGOUGH  2,968,141
POLE SUPPORTED FRUIT HARVESTER WITH ENDLESS PICKING MEANS
Filed Feb. 6, 1959  3 Sheets-Sheet 1
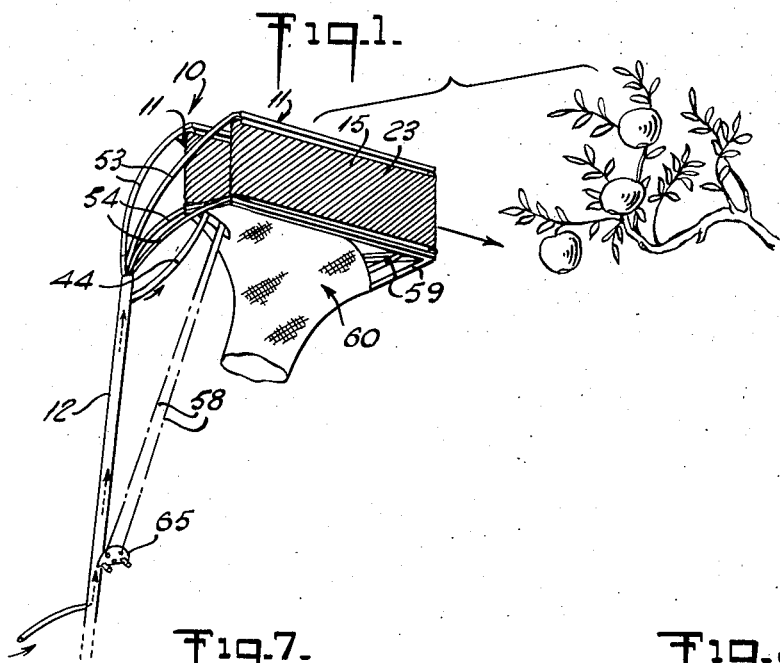
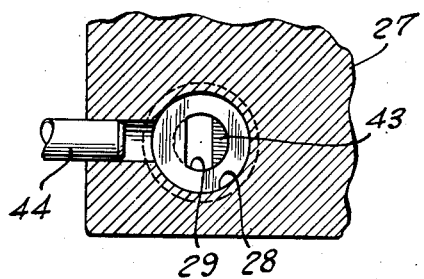
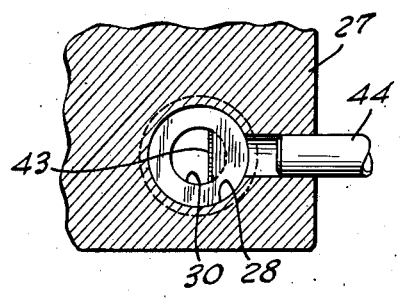
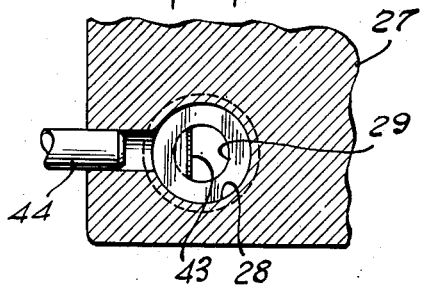
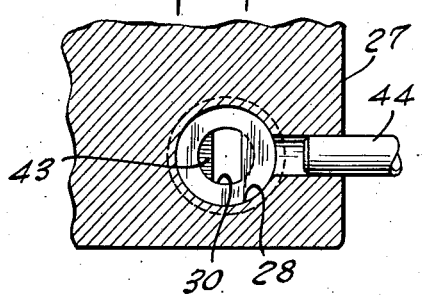
INVENTOR
JOHN J. McGOUGH
BY
ATTORNEY

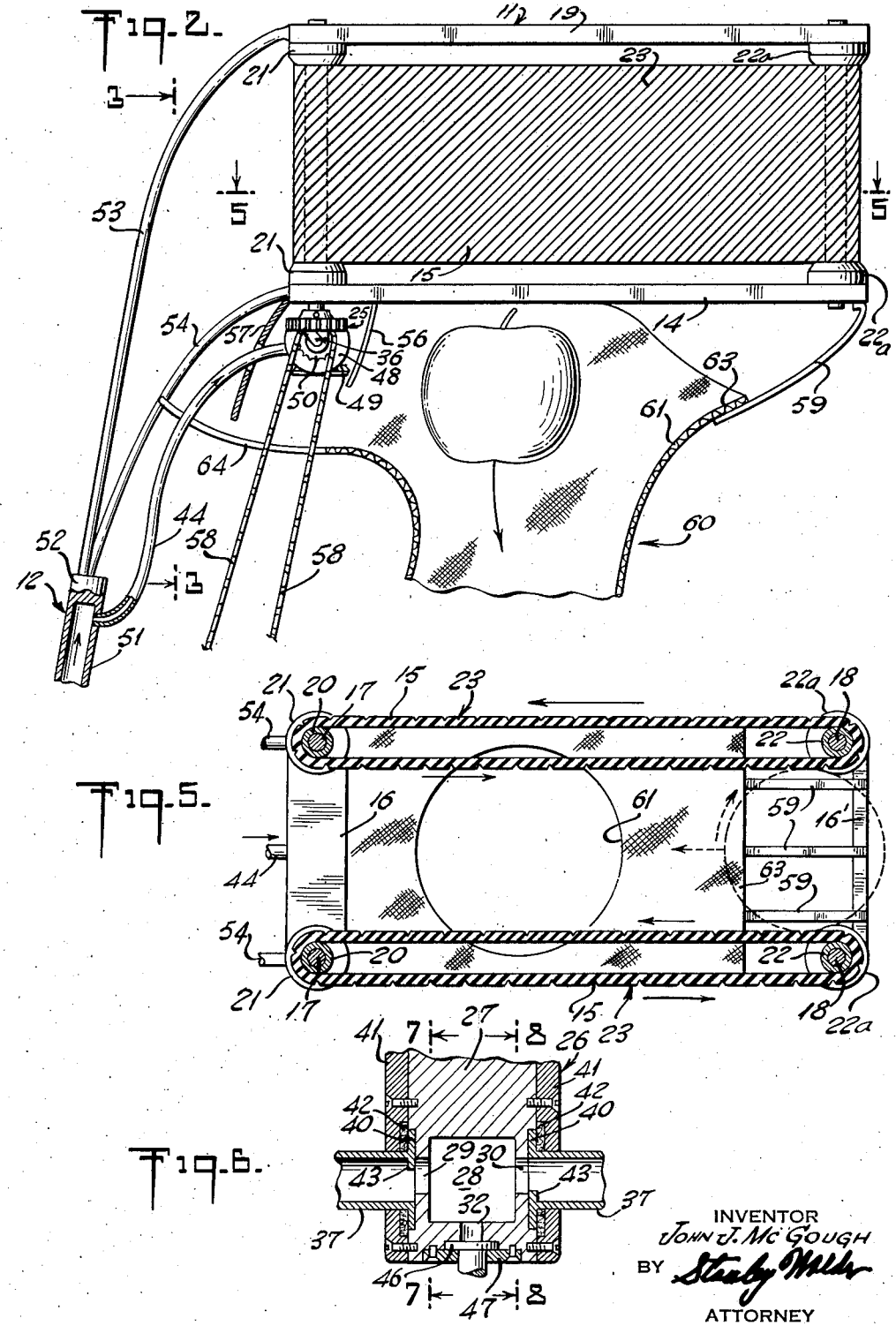

Jan. 17, 1961  J. J. McGOUGH  2,968,141
POLE SUPPORTED FRUIT HARVESTER WITH ENDLESS PICKING MEANS
Filed Feb. 6, 1959  3 Sheets-Sheet 3
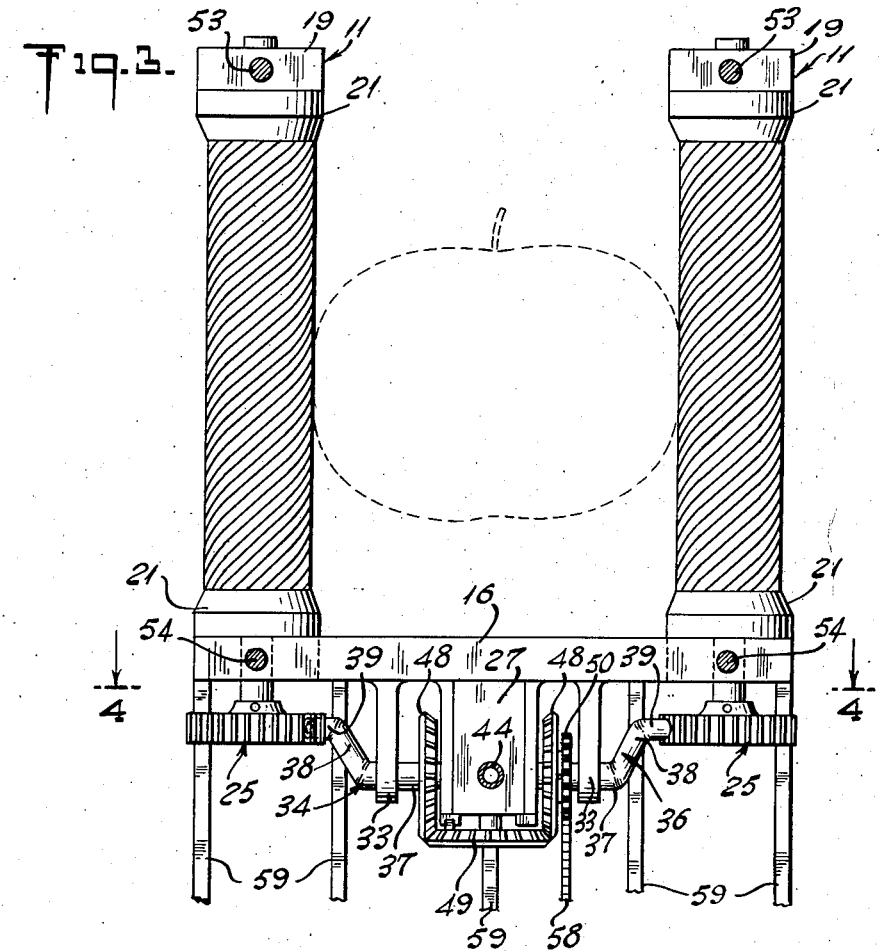
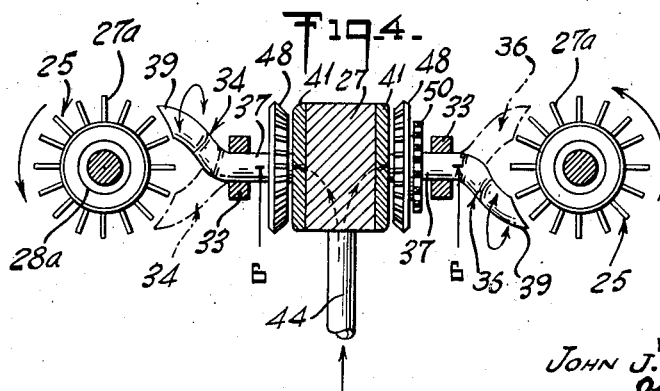
INVENTOR
JOHN J. McGOUGH
BY
ATTORNEY United States Patent Office 2,968,141
Patented Jan. 17, 1961

2,968,141

POLE SUPPORTED FRUIT HARVESTER WITH ENDLESS PICKING MEANS

John J. McGough, 35—16 79th St., Jackson Heights, N.Y.

Filed Feb. 6, 1959, Ser. No. 791,664

5 Claims. (Cl. 56—332)

The present invention relates generally to improvements in harvesting equipment and more particularly to an improved apparatus for the picking of fruit or similar products from trees, bushes and the like.

The picking of fruit from trees without bruising or adversely affecting the fruit has heretofore been a tedious and expensive process and has materially increased the cost of the fruit. It has been conventional to pick the fruit by hand by pulling it from the stem or by cutting the stem and then depositing the fruit in a suitable receptacle. It is apparent that this hand picking method is highly labor and time consuming and leaves much to be desired. There have been many methods proposed to obviate the necessity of hand picking the fruit but these methods possess many disadvantages and drawbacks.

It is an object of the present invention to provide an improved harvesting machine.

Another object of the present invention is to provide an improved apparatus for the picking of fruit or similar products from trees, bushes and the like.

Still another object of the present invention is to provide an improved fruit harvesting machine that may be simply operated and manipulated by an individual on the ground or an elevated platform.

A further object of the present invention is to provide an improved fruit harvesting apparatus which need not be directed at the individual fruits but is employed by merely systematically or randomly transporting the apparatus through the fruit-laden zones in any convenient direction, vertical, horizontal, inclined, forward or rearward.

Still a further object of the present invention is to provide an improved fruit harvesting device of the above nature which may be manually controlled and transported or may be mechanically controlled and transported by truck, tractor or the like and in which a plurality of such devices may be arranged and operated in stacked, tandem or other arrangement.

Another object of the present invention is to provide a fruit harvesting apparatus of the above nature, characterized by its ruggedness, simplicity and ease of operation.

The above and other objects may be attained in the preferred illustrated embodiment of the present invention which comprises a pair of endless belts having confronting laterally spaced longitudinal runs extending from the leading throat-defining end rearwardly to a trailing end, a chute communicating with the space between the confronting runs of the endless belts and means driving the belts so that the confronting runs will move relative to each other and the average movement is rearwardly from the said throat.

In its preferred form the harvesting device includes a head or bracket section upon which are mounted two transversely spaced pairs of longitudinally spaced front and rear drums. Each pair of drums engages a belt and means, preferably air driven, are coupled to the rear drums to drive them in a like sense but at different rates of speed along their confronting runs. The belts run in opposite directions but have a resultant aggregate movement from the throat-defining front portion towards the rear. Means are provided to reverse the movements and relative speeds of the belt, thereby in effect reversing the orientation of the device.

A chute is carried by the support frame having an upwardly directed opening extending along the full area of the space between the confronting runs of the belts. Handle means are provided for suitably supporting and manipulating the harvesting device, the handle being hollow so as to provide conduit means for the compressed air which actuates the device.

In use, the device is merely transported through the branches of a fruit-laden tree, bush or the like, so that the fruit enters the throat of the device between the confronting longitudinal runs. As the fruit is engaged between the belts it is twisted by reason of the relative movement of the belts to effect its separation from the branch and is then transported rearwardly from the throat by reason of the aggregate movement of the belts being rearward. The fruit then falls from the belt into the chute either by gravity or by reason of the configuration of the belt surfaces.

Other objects and a fuller understanding of the present invention may be had by referring to the following detailed description and claims, taken in conjunction with the accompanying drawings which illustrate the preferred embodiments thereof, it being understood that the foregoing statement of the objects of the invention and the brief summary thereof is intended to generally explain the same without limiting it in any manner.

Fig. 1 is a perspective view of a fruit harvesting device embodying the present invention, shown in use, and partially broken away for convenience of illustration.

Fig. 2 is an enlarged side elevational view of the upper portion of the device, illustrated partially in section and partially broken away.

Fig. 3 is a sectional view taken along line 3—3 of Fig. 2.

Fig. 4 is a sectional view taken along line 4—4 of of Fig. 3.

Fig. 5 is a sectional view taken along line 5—5 of Fig. 2.

Fig. 6 is an enlarged sectional view taken along line 6—6 of Fig. 4.

Fig. 7 is a sectional view taken along line 7—7 of Fig. 6.

Fig. 7a is a view similar to Fig. 7, the valve element being illustrated in opposite orientation.

Fig. 8 is a sectional view taken along line 8—8 in Fig. 6.

Fig. 8a is a view similar to Fig. 8 with the valve element shown in opposite orientation.

Referring now to the drawings wherein the preferred form of the present invention is illustrated, the numeral 10 generally designates the improved harvesting device which includes a head portion or supporting bracket 11, a handle or upright 12 and a chute 60. Bracket 11 includes a lower rectangular frame consisting of transversely spaced longitudinally extending bars 14 connected at their front and rear ends by cross bars 16, 16' to provide a rigid frame structure. Journalled to the trailing ends of the bars 14 are vertical rotatable shafts 17 which project above the bars 14 and for a short distance below the bars 14. Also journalled to the front ends of bars 14 are upwardly directed vertical shafts or axles 18. In order to reinforce the vertical positioning of shafts 17 and 18 there are provided longitudinally extending bars 19 which are provided with suitable openings at their opposite ends rotatably engaging the upper ends of corresponding shafts 17 and 18.

Registering with each of shafts 17 and affixed to and rotatable therewith is a drum 20 provided with suitable end flanges 21 embraced between the confronting walls of bars 14 and 19. Similarly shaped drums 22 are rotatably mounted on axles 18 and are likewise provided with end flanges 22a embraced between the forward ends of bars 14 and 19, drums 22 acting as idler drums. Note that suitable bearings, such as roller bearings, ball bearings or the like, are provided in any known manner to permit the free and easy rotation of the various shafts and drums.

An endless belt 23 of substantially the height of drums 20 and 22 extends between and is engaged by each pair of longitudinally spaced drums 20 and 22 and is rotatable therewith. Belt 23 may be formed of any suitable material such as a rubberized canvas duck, and is preferably provided along its outer surface with a layer of spongy, soft, resilient material so as to minimize any damage to or bruising of the picked fruit, such as, for example, sponge rubber or a foam thermoplastic material such as polyurethrane or polyvinyl chloride. The surface of the resilient layer is provided with diagonal grooves 15 which are rearwardly downwardly inclined along the confronting runs of belts 23.

The belt and drum motivating means include an air turbine 25 of any suitable type having vanes 27a and a hub portion 28a which is affixed to the lower end of each of shafts 17 and is rotatable therewith. Depending from cross bar 16, intermediate the ends thereof, is a plenum or air distributing chamber and valve means 26. The plenum chamber 26 includes a core member 27 having a cavity 28 formed therein provided with communicating laterally extending bores or ports 29 and 30, respectively, which define outlet ports, and a rearwardly extending bore 32 which defines a compressed air inlet port.

As seen in Figs. 7 through 8a of the drawings, bores 29 and 30 are of symmetrical partially circular transverse cross-section. A circular shallow recess is formed coaxial with each of bores or ports 29, 30 and 32 in the outer faces of core member 27.

A pair of apertured bracket members 33 depend from the cross bar 16 and are spaced from the opposite sides of plenum chamber 26. Tubular nozzle members 34 and 36, respectively, are each provided with inner horizontal legs 37, inclined intermediate legs 38 and outer legs 39, having jet openings directed substantially tangently at turbine vanes 27a, nozzle inner legs 37 rotatably registering with the apertures in brackets 33. The legs 37 terminate in outwardly directed flanges 40 which rotatably register with the core recesses surrounding bores 29 and 30 and are locked in position by side plates 41 which are removably secured to core member 27 by suitable screws and are provided with washers 42 nesting in recesses in plates 41 and abutting the outer faces of flanges 40 to permit the free rotation thereof.

The inner openings of nozzles 34 and 36 which confront the corresponding bores 29 and 30 are provided with valve plates 43 so as to provide openings similar in cross-section to that of bores 29 and 30, the corresponding openings in nozzles 34 and 36 being oppositely oriented. Thus the opening of ports 29 and 30 can be varied between an open position as indicated in Figs. 7a and 8 and partially closed position as illustrated in Figs. 7 and 8a, as will be hereinafter more particularly set forth.

A compressed air feed pipe 44 terminates at its inner end in an outwardly directed flange 46 which registers with the recess surrounding inlet port 32 and is locked in position by an apertured end plate 47 secured to core member 27 and bearing against flange 46.

A nozzle control mechanism includes a pair of bevel gears 48 affixed to nozzle legs 37 adjacent the wide walls of plenum chamber 26. A third bevel gear 49 engages the bevel gears 48 to define therewith a differential gear train, bevel gear 49 being rotatably supported from the bottom wall of the plenum chamber 26. Thus rotation of one of the nozzles 34 or 36 about its leg 37 will result in rotation of the other nozzle in an opposite direction. A spur gear 50 is affixed to the leg 37 of nozzle 36 between bevel gear 48 and bracket 33.

Handle 12 is vertically and longitudinally offset relative to bracekt 11 and is inclined thereto, handle 12 being defined by an elongated tubular member 51 closed at its top as at 52 and connected by any suitable means to a source of compressed air. The upper end of handle 12 is connected by a first pair of upwardly diverging curved fingers 53 to the trailing ends of upper longitudinal bars 19 and by a second pair of upwardly diverging fingers 54 to the trailing ends of lower longitudinal bars 14 whereby to firmly support bracket 11 on handle 12.

It should be noted that the upper ends of fingers 53 are sufficiently separated so as to provide free longitudinal access into the space between the confronting runs of belts 23.

Forward and rear shield plates 56 and 57, respectively, of plenum chamber 26 and turbine wheels 25 extend for the full width of bracket 11 to thereby protect the various gears, turbine wheels and nozzles from being damaged by the branches, leaves or other objects. An opening is formed in shield 57 to permit the passage of air feed pipe 44 which communicates with the interior of the handle defining tubular member 51. A sprocket chain 58 engages the spur gear 50 and extends to the lower part of handle 12, the free ends of sprocket chain 58 engaging the opposite ends of a lever 65 rockably mounted on handle 12, thereby permitting the rotation of spur gear 50, nozzle 36, and nozzle 34 by way of bevel gears 48 and 49.

A plurality of parallel laterally spaced tines 59 extend downwardly and rearwardly from the leading lower end of bracket 11. A chute member 60, formed of canvas or other suitable material, is disposed below the bottom of bracket 11 and has an outwardly flared throat 61 having an opening directed upwardly toward the space between the confronting runs of belts 23. The upper forward border 63 of chute throat 61 is secured to the lower free ends of tines 59 and the rear border of throat 61 is secured to the fingers 54 at points rearwardly of the trailing ends of longitudinal bars 14. An opening 64 is formed in the trailing border of throat 61 to permit the free passage of feed pipe 44 and sprocket chain 58.

Considering now the operation of the harvesting device described above, the sprocket chain 58 is manipulated to turn the nozzle 36 to the position illustrated in Fig. 4 of the drawings, the nozzle 34 being concurrently rotated by way of bevel gears 48 and 49 to an oppositely directed position. The compressed air passing upwardly through the handle 12 and the air feed pipe 44 enters plenum chamber cavity 28 where it is distributed through nozzles 34 and 36 and directed at turbine wheel vanes 27a. The jets of air from nozzles 34 and 36 drive the turbine wheels 25 in a common counterclockwise direction. As seen in Figs. 7 and 8 of the drawings, the passageway between plenum chamber port 29 and the nozzle registering therewith is restricted by valve plate 43, whereas port 30 is completely open. Thus, in this position, the belt associated with the nozzle 34 is driven at a slower speed than the belt associated with nozzle 36. Moreover, slowly moving belt 23 moves along its inner run toward the leading or throat end of bracket 11, whereas the other belt 23 moves from the leading end of the bracket towards the trailing end thereof, so that the average movement of the belts along their confronting runs is rearward, that is from the leading towards the trailing end thereof. It should be noted that when the term "average movement" is employed in the claims herein as applied to the confronting runs of the belt, what is meant is the average velocity thereof, considering both speed and direction, that is, where the directions of movement are opposite their signs are opposite. Thus when both runs are rearward their average motion is rearward, when one run is rearward at a greater speed than the other run which is forward the average motion is still rearward and in the latter case when the forward speed is greater than the rearward speed the average motion is forward.

In employing the improved harvester, head 11 is transported through the fruit-laden branches of the plant by suitably manipulating handle 12 so that the fruit enters the leading throat portion between the confronting runs of belts 23. The fruit is thus engaged by the confronting runs of belts 23 and twisted by reason of the relative movement between the belts to effect a twisting of the fruit and it is separated from the supporting twig or stem. After or during the separation of the fruit it is transported rearwardly by the belts since their aggregate movement is towards the rear along the confronting runs and it is then dropped from between the belts into chute 60 either by gravity or by reason of the ridges formed by the inclined grooves 15.

By rocking lever 65, nozzle 36 is rotated about the axis of leg 37 180° to the position illustrated by broken line in Fig. 4 of the drawing, and nozzle 34 is likewise rotated 180° by bevel gears 48 and 49 to the position shown in broken line. The aforesaid reversal of the nozzles 34 and 36 result in the jets of air being directed at the turbine vanes 27a in a direction opposite to that of the previous position so that the belts likewise move in opposite directions. Furthermore, the rotation of legs 37 result in the valve plates 43 being correspondingly moved as to now restrict the opening in port 30 and fully open port 29, as illustrated in Figs. 7a and 8a of the drawings to thereby reverse the relative speeds of belts 23. As a consequence, the direction of the average aggregate movement of belts 23 along their confronting runs are likewise reversed so that fruit engaged between the trailing ends of the belt is engaged and advanced towards the leading end of head 11. This permits the movement of the head both forwardly and rearwardly and effecting the picking operation during each movement since by the manipulation of nozzles 34 and 36 by way of lever 65 as aforesaid either end of head 11 may define the picking throat end.

It should be noted that any leaves, twigs, branches, or the like, which enter between the confronting runs of belts 23 are not damaged or otherwise adversely affected since they may pass freely along the space.

While there has been described and illustrated a preferred embodiment of the present invention, it is apparent that numerous changes, alterations or additions may be made without departing from the spirit thereof.

What is claimed is:

1. A head for use with a pole supported chute, comprising a frame, a pair of endless belts having opposed coacting flights, supporting drums about which each belt is trained, said drums being mounted on said frame, differential driving means operatively connected to at least one drum of each belt, and the drums being driven in the same direction, thus causing the opposed flights to move in opposite directions at different speeds, whereby when a fruit is engaged between said belts it will be twisted and moved inwardly to be deposited in said chute.

2. A head for use with a pole supported chute, in accordance with claim 1, wherein said driving means includes a compressed aid driven motor.

3. A head for use with a pole supported chute, in accordance with claim 1, wherein said driving means includes a means for selectively reversing the direction of said belts.

4. A head for use with a pole supported chute, in accordance with claim 1, wherein said driving means includes a means for controlling the relative speeds of said belts.

5. A head for use with a pole supported chute, in accordance with claim 1, wherein said belts are provided with ridged outer surfaces consisting of soft resilient material.

References Cited in the file of this patent

UNITED STATES PATENTS

| | | |
|---|---|---|
| 2,288,682 | Chittenden | July 7, 1942 |
| 2,581,236 | Cardinale | Jan. 1, 1952 |
| 2,698,508 | Hollister | Jan. 4, 1955 |